US010176109B2

(12) United States Patent
Harris et al.

(10) Patent No.: US 10,176,109 B2
(45) Date of Patent: Jan. 8, 2019

(54) PERMUTED MEMORY ACCESS MAPPING

(71) Applicant: Oracle International Corporation, Redwood City, CA (US)

(72) Inventors: Timothy L. Harris, Cambridge (GB); David Dice, Foxboro, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 15/493,035

(22) Filed: Apr. 20, 2017

(65) Prior Publication Data

US 2018/0307617 A1    Oct. 25, 2018

(51) Int. Cl.
*G06F 12/10* (2016.01)
*G06F 12/1009* (2016.01)
*G06F 12/14* (2006.01)
*G06F 12/1027* (2016.01)

(52) U.S. Cl.
CPC ...... *G06F 12/1009* (2013.01); *G06F 12/1027* (2013.01); *G06F 12/1433* (2013.01); *G06F 2212/206* (2013.01); *G06F 2212/2532* (2013.01); *G06F 2212/65* (2013.01); *G06F 2212/68* (2013.01)

(58) Field of Classification Search
CPC ............. G06F 12/1009; G06F 12/1027; G06F 12/1433
USPC ..................................... 711/100, 5, 207, 206
See application file for complete search history.

(56) References Cited

U.S. PATENT DOCUMENTS

| 4,506,364 | A |   | 3/1985  | Aichelmann, Jr. et al. |
| 5,835,963 | A | * | 11/1998 | Yoshioka ............ G06F 12/1054 711/207 |
| 6,145,065 | A |   | 11/2000 | Takahashi et al. |
| 6,557,083 | B1 | * | 4/2003 | Sperber ............... G06F 12/0875 711/118 |
| 6,598,144 | B1 | * | 7/2003 | Bailey ................... G06F 12/145 711/202 |

(Continued)

OTHER PUBLICATIONS

Michael Beynon, et al., "DataCutter: Middleware for Filtering Very Large Scientific Datasets on Archival Storage Systems", IEEE Symposium on Mass Storage Systems, 2000, pp. 119-133.

(Continued)

*Primary Examiner* — Pierre Miche Bataille
(74) *Attorney, Agent, or Firm* — Robert C. Kowert; Meyertons, Hood, Kivlin, Kowert & Goetzel, P.C.

(57) ABSTRACT

When performing non-sequential accesses to large data sets, hot spots may be avoided by permuting the memory locations being accesses to more evenly spread those accesses across the memory and across multiple memory channels. A permutation step may be used when accessing data, such as to improve the distribution of those memory accesses within the system. Instead of accessing one memory address, that address may be permuted so that another memory address is accessed. Non-sequential accesses to an array may be modified such that each index to the array is permuted to another index in the array. Collisions between pre- and post-translation addresses may be prevented and one-to-one mappings may be used. Permutation mechanisms may be implemented in software, hardware, or a combination of both, with or without the knowledge of the process performing the memory accesses.

20 Claims, 9 Drawing Sheets

(56) References Cited

U.S. PATENT DOCUMENTS

| | | | |
|---|---|---|---|
| 7,711,903 B2* | 5/2010 | Day | G06F 12/1027 |
| | | | 711/133 |
| 8,122,190 B1 | 2/2012 | Doi | |
| 9,323,654 B2 | 4/2016 | Anatasov | |
| 9,830,084 B2* | 11/2017 | Thakkar | G06F 3/061 |
| 2006/0129786 A1* | 6/2006 | Yamazaki | G06F 12/10 |
| | | | 711/206 |

OTHER PUBLICATIONS

David Gleich, et al., "Scalable Computing for Power Law Graphs: Experience with Parallel PageRank", In Proc. SuperComputing, 2005, pp. 1-10.

Da Yan, et al., "Effective Techniques for Message Reduction and Load Balancing in Distributed Graph Computation", Proceeding of the 24th International Conference on World Wide Web, 2015, pp. 1-11.

Zuhair Khayyat, et al, "Mizan: A System for Dynamic Load Balancing in Large-scale Graph Processing", ACM, Eurosys '13, Apr. 15-17, 2017, pp. 169-182.

Kenneth E. Batcher, "STARAN parallel processor system hardware", In Proceeding of the May 6-10, 1974, National Computer Conference and Exposition, ACM, pp. 405-410.

Yingyi Bu, et al., "HaLoop: Efficient Iterative Data Processing on Large Clusters", Proceedings of the VLDB Endowment, vol. 3, No. 1, Sep. 13-17, 2010, pp. 285-296.

\* cited by examiner

PERMUTED MEMORY ACCESS MAPPING

BACKGROUND

Field of the Disclosure

This disclosure relates generally accessing large data sets and more specifically to non-sequential accesses to large in-memory data sets.

Description of the Related Art

Non-sequential access to large data sets may cause significant performance issues, such as due to poor load balancing of data accesses across multiple memory channels. In general, various workloads, such as in-memory graph analytics may make large volumes of non-sequential memory accesses, which may cause "hot spots" in the memory system if frequently accessed data are located near each other. For instance, according to one example a single iteration of a network mapping and ranking algorithm, such as the PageRank™ algorithm, on a benchmark input of size 540 GB may iterate sequentially over approximately 540 GB of data and may perform a further 512 GB of non-sequential accesses into around 12.5 GB of data. The non-sequential accesses may be skewed disproportionately toward hot data: some of the 12.5 GB may be accessed many times, and some may be accessed only once (if at all).

Such hot spots may cause a disproportionate number of accesses to be directed to the same memory channel and may further result in frequent misses in the last level cache. If one memory channel becomes saturated before others, the entire progress of the workload may slow. Additionally, translation look-ahead buffer (TLB) space may be limited in size and it may be advantageous to reduce the number of TLB entries used. Furthermore, after TLB translation, each physical page of memory is typically located on a single socket (and hence on a specific memory channel or set of memory channels on that socket). For instance, on a SPARC system, physical memory for a given TLB mapping is always held on a single socket as a contiguous block aligned to a multiple of the page size. Traditionally, when attempting to distribute memory system load more evenly, systems have used smaller page sizes, which may increase TLB pressure, or use hardware support for per-cache-line interleaving, which may preclude the use of other optimizations on multi-socket machines, or may explicitly randomize data layouts on loading, frequently requiring additional processing time and/or temporary storage, as well as possibly requiring different layouts to be selected for different computations and/or workloads.

Figure 1:
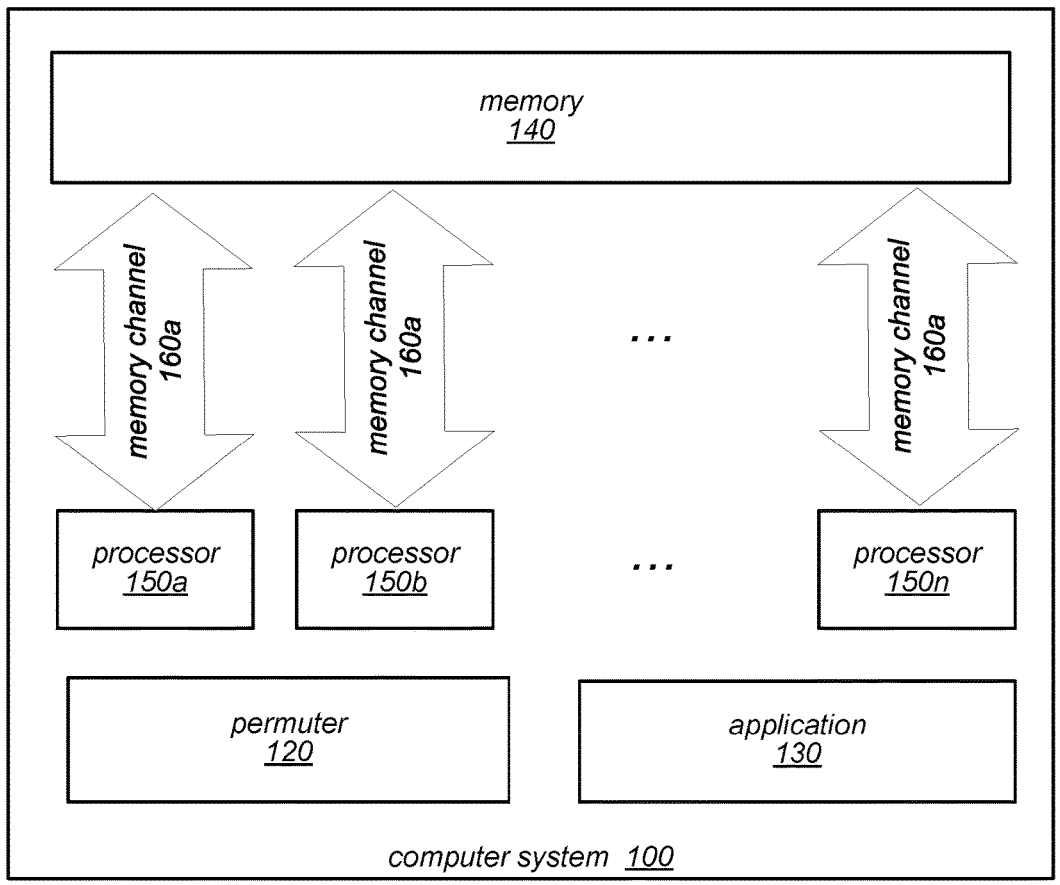
FIG. 1 is a logical block diagram illustrating an example system configured to implement Permuted Memory Access Mapping as described herein, according to one embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating,"

"determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

SUMMARY

Disclosed herein are various systems, methods and/or techniques for Permuted Memory Access Mapping. The systems, methods and/or techniques described herein may, in some embodiments, involve permuting non-sequential memory accesses and may be applicable to large data sets and/or a broad class of graph analytics workloads, and indeed to other workloads where non-sequential access patterns are significant.

In some embodiments, a permutation step may be added when accessing data, such as to improve the distribution of those memory accesses within the system. Thus, instead of accessing one memory address, that address may be permuted so that another memory address is accessed. For example, in some embodiments, non-sequential accesses to an array may be modified such that each index to the array is permuted to another index in the array, thereby possibly spreading the accesses more evenly across the memory space and across multiple memory channels.

When permuting memory locations to be accessed, a permutation function may not only translate one location into another location, but may also utilize a particular mapping between pre- and post-translation addresses, according to some embodiments. For example, in some embodiments a permutation function may be configured to prevent collisions (e.g., when two or more locations are translated to a single translated location) such that distinct input locations may always map to distinct output locations. In other words, no two input locations may be permuted to the same translated location. In other embodiments, a permutation function may ensure a one-to-one mapping between pre- and post-translation addresses (e.g., such as for efficiency by avoiding "unused" output locations).

Any of various permutation mechanisms may be utilized and may be implemented in software, hardware, or a combination of the hardware and software, according to different embodiments. Additionally, the permutations may be performed with or without the knowledge of the process actually performing the memory accesses.

DETAILED DESCRIPTION OF EMBODIMENTS

As noted above, the systems, methods and/or techniques described herein may, in some embodiments, be applicable to a broad class of graph analytics workloads, and indeed to other workloads where non-sequential access patterns are significant. In some examples, workloads may be characterized by a combination of (i) sequential access through large arrays defining the structure of the graph, and (ii) significant volumes of non-sequential memory accesses, such as those reading per-vertex or per-edge properties of the graph.

According to some embodiments, such workloads may benefit from high bandwidths to main memory. For example, hardware may provide multiple (even large numbers of) memory channels and 1-DIMM-per-channel configurations. For example, a system may include multiple memory channels thereby providing multiple communication paths between memory and the processor(s) and/or memory controller(s). In some embodiments, different areas (e.g., different DIMMs) may be accessible via different memory channels.

FIG. 1 is a logical diagram illustrating a system configured to implement Permuted Memory Access Mapping as described herein, according to one embodiment. As illustrated in FIG. 1, a computer system 100 may include a plurality of processors, such as processors 150$a..n$ coupled to a memory 140. System 100 may also include a plurality of memory channels, such as memory channels 160$a..n$, via which the processors 150$a..n$ may access, or otherwise communicate with, memory 140. In some embodiments, memory 140 may include physically separate memory modules associated with memory channels 160$a..n$. Memory 140 may appear as one memory to other parts of system 100 (e.g., such as to software executing on system 100), but may be split into multiple pieces in hardware according to some embodiments. In addition, in some embodiments system 100 may be configured to implement any of various memory mapping mechanisms, such as a virtual to physical memory mapping mechanism, to govern the addressing of accesses to memory 140 by processors 150$a..n$ via memory channels 160$a..n$.

An application, such as application 130 may be configured to perform a plurality of accesses to memory 140 and may be further configured to utilize multiple processors, such as two or more of processors 150$a..n$, in a multi-tasking manner, such that each processor being used by application 130 may be configured to perform some portion of the total memory accesses perform by application 130. In some embodiments, the memory accesses performed by application 130 may tend to form hot data areas (e.g., memory addresses or ranges that are accessed more frequently than others). Thus, application 130 may be configured to utilize one or more of the methods, features and/or techniques described herein, such as to more evenly map memory accesses (e.g., esp. non-sequential accesses) across the processors 150$a..n$ and/or memory channels 160$a..n$. In some embodiments, application 130 may utilize permuter 120 when implementing the methods, features and/or techniques described herein. For example, permuter 120 may be function used by, and possibly a part of, application 130. In other embodiments, however, permuter 120 may represent a separate function, method, system, and/or service provided by, or part of, system 100. For instance, in one embodiment, permuter 120 may represent system provided permute service configured to implement some (or all) of the methods, features and/or techniques described herein.

In another embodiment, permuter 120 may represent one or more hardware instructions implemented by processors 150$a..n$ to perform one or more permutation and/or translation operations on memory addresses/locations. Note that the terms "permute" and "translate" may be used interchangeable herein. Additionally, permuter 120 may represent one or more hardware instructions as well as additional software and/or firmware configured to utilize the one or more hardware instructions to support application 130 to implement Permuted Memory Access Mapping, according to various embodiments. In some embodiments, permuter 120 and/or the methods, functions, features, and/or techniques performed thereby may be transparent to application 130, while in other embodiments, application 130 may be aware of, and/or coordinate with, permuter 120 to implement the methods, features, functions and/or techniques descried herein.

While illustrated in FIG. 1 as separate from application 130, in some embodiments, permuter 120 may be part of application 130. In yet other embodiments, permuter 120 may represent a combination of features some of which are part of application 130 while other are separate from application 130.

As noted above, a system configured to implement Permuted Memory Access Mapping may include multiple memory channels thereby providing multiple communication paths between memory and the processor(s) and/or memory controller(s). However, to use such hardware effectively software may need to more evenly map a mix of sequential and non-sequential access patterns over the memory channels available (e.g., such as to avoid hot spots in the memory system).

In some embodiments, sequential accesses to a large data set may be easier to handle, such as to achieve a more balanced use of memory channels. For instance, the volume of data to be accessed may be divided evenly, or equally, between HW/processor sockets (e.g., to spread the memory access load), and large page sizes may be used, such as to reduce translation lookaside buffer (TLB) pressure.

However, even when the volume of accessed data is divided between sockets, non- sequential access to a large data set may be inefficient due to a skew toward hot data. As used herein, the term "hot data" may refer to any particular memory address, or set of memory addresses, that are accessed more frequently than other memory addresses over a particular time frame. For instance, when performing an algorithm that accesses a large data set, there may be one or more areas of hot data, with some areas being hot over the entire process while other areas are hot only over a shorter time frame within the overall process.

To mitigate issues of hot data and non-sequential access, in some embodiments, an additional permutation step may be performed on memory accesses, especially non-sequential memory accesses. For instance, in one embodiment, array element arr[fx(idx)] may be accessed in place of the original element arr[idx]. Thus, a permutation function (e.g., the function fx) may permute the accesses so that nearby indices are likely to map to different locations in memory, and hence to different pages (even when using large page sizes). Thus, any skew in the access patterns (e.g., toward or causing hot data) may be distributed more evenly across the complete data set and therefore more uniformly over the memory channels. In some embodiments, permuting data access locations may retain the benefits of using large page sizes (i.e., to reduce TLB pressure) while distributing the volume of accesses across sockets and/or memory channels.

In some embodiments, permuting memory accesses may be referred to as "randomization" and a permuter may be implemented using functions similar to those used to implement pseudo-random number generation. While "random" mappings (e.g., translations) provided by a permutation function utilizing randomization may be fast (e.g., execute quickly) possibly providing good dispersal of accesses (e.g., accesses more evenly spread across memory) without requiring properties expected of a cryptographic hash function or pseudo-random number generator, in other embodiments using a random function to permute or translate memory accesses may result in collisions (e.g., when two or more addresses are translated to a single post-translation address).

Figure 2:
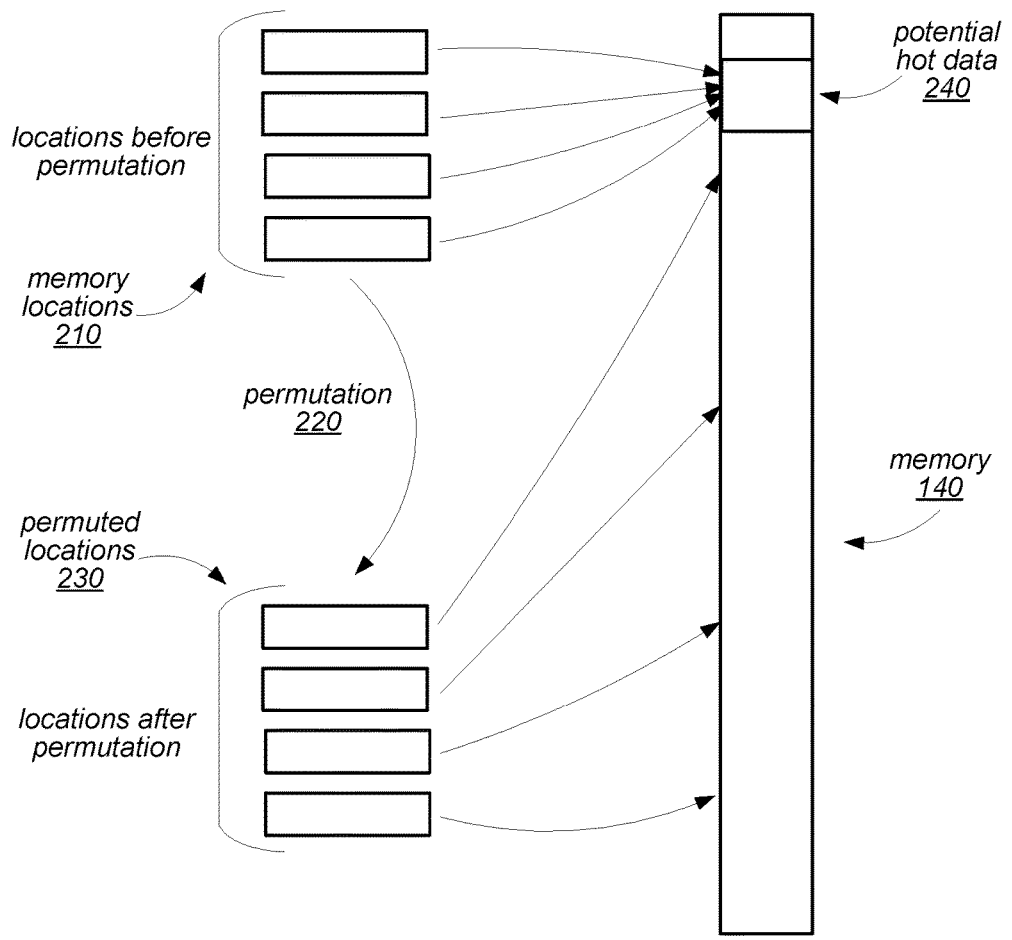
FIG. 2 is a logical block diagram illustrating Permuted Memory Access Mapping, according to one embodiment.

FIG. 2 is a logical block diagram illustrating the use of Permuted Memory Access Mapping, as described herein according to one embodiment. If memory locations 210, which may represent various addresses within memory 140 were to be accessed without applying a permutation step, the resulting accesses may be all located within a narrow address range within memory 140, as represented by potential hot data 240. For example, in an embodiment based on a network mapping and ranking algorithm, memory locations 210 may represent accesses related to a particular popular network site, a celebrity's social network, etc. and may therefore be accessed more frequently than other locations being accessed. In addition, memory locations 210 may represent accesses via a single memory channel.

However, when utilizing (or applying) a permutation step, represented by arrow 220, the resulting permuted locations 230 may represent addresses in memory 140 that are more evenly distributed across memory 140, according to some embodiments. For instance, permutation 220 may represent the application of a permutation function or other utilization of a permuter 120 (e.g., whether implemented in software, firmware, hardware, etc. and whether in cooperation with, or transparent to, software accessing permuted locations 230). Additionally, permuted locations 230 may represent accesses to memory 140 via multiple (or at least more) memory channels than if memory locations 210 were accesses without applying a permutation step (e.g., without using a permuter 120 or other permutation function). In some embodiments, the permutation of locations may disperse memory accesses such that locations that were near to each other prior to being permuted are farther apart after being permuted. For example, in the example embodiment illustrated in FIG. 2, the distance between individual ones of permuted locations 230 is greater than the distance between corresponding ones of memory locations 210 prior to permutation. Thus, in some embodiments a permutation function may cause (e.g., via permutation) a dispersal of nearby input locations to far-apart (or at least farther apart) output locations.

Tables 1(a), 1(b) and 1(c) below illustrate, according to one embodiment, an example network mapping and ranking algorithm running 50 iterations on a 540 GB input file using 12 sockets on a SPARC M7-16 system.

TABLE 1(a)

| Execution time. | |
|---|---|
| Default | 422 s |
| Equal volume | 340 s |
| Permuted | 224 s |

TABLE 1(b)

| Per-socket memory bandwidth, equal-volume configuration. | | |
|---|---|---|
| Board | Avg Tot | Peak Tot (GB/s) |
| Brd 2 | 103.72 | 112.66 |
| Brd 3 | 59.09 | 64.56 |
| Brd 4 | 41.18 | 45.23 |
| Brd 5 | 30.59 | 33.57 |
| Brd 6 | 24.62 | 26.53 |
| Brd 7 | 20.93 | 22.82 |
| Brd 8 | 18.27 | 19.39 |
| Brd 9 | 16.68 | 17.90 |
| Brd 11 | 15.20 | 16.01 |
| Brd 13 | 14.34 | 16.03 |

TABLE 1(b)-continued

Per-socket memory bandwidth, equal-volume configuration.

| Board | Avg Tot | Peak Tot (GB/s) |
| --- | --- | --- |
| Brd 14 | 13.34 | 15.28 |
| Brd 15 | 12.86 | 15.81 |
| All | 371.29 | 400.43 |

TABLE 1(c)

Per-socket memory bandwidth, permuted configuration.

| Board | Avg Tot | Peak Tot (GB/s) |
| --- | --- | --- |
| Brd 2 | 29.17 | 34.69 |
| Brd 3 | 28.99 | 34.67 |
| Brd 4 | 33.29 | 39.78 |
| Brd 5 | 34.08 | 40.72 |
| Brd 6 | 33.08 | 39.47 |
| Brd 7 | 33.02 | 39.36 |
| Brd 8 | 30.68 | 36.69 |
| Brd 9 | 30.57 | 36.74 |
| Brd 11 | 30.57 | 37.56 |
| Brd 13 | 30.49 | 37.52 |
| Brd 14 | 30.35 | 37.34 |
| Brd 15 | 30.66 | 37.73 |
| All | 376.28 | 453.76 |

Table 1(a) above shows summary results, according to one example embodiment, of running an example network mapping and ranking algorithm on a SPARC M7-16 system providing 16 sockets supporting a total of 4096 hardware threads and 8 TB cache-coherent memory. The permutation techniques, described herein, reduce the running time to 224s, compared with 422s for OS-default settings, according to one example embodiment. In general, performance improvements may vary from workload to workload and from embodiment to embodiment. For example, in some embodiments other workloads result in over 4×improvements in performance where the permutation avoids extreme (e.g., worst case) memory placements.

Table 1(a) above shows three variants of the example algorithm. A first variant, according to one embodiment, referred to as "Default" in the table above, uses the standard allocation policies in the operating system (e.g., Solaris 11.3). All data for the algorithm is, for this example, allocated with ACCESS_MANY to indicate that accesses will be made from across the machine. In this example, allocations may tend to use 4 MB pages in this example workload.

A second variant, referred to as "Equal volume" in the table above, explicitly selects a page size for each allocation and distributes 1/16 of the allocation onto each of the 16 active sockets. In this example, allocations may tend to be made with 256 MB and 2 GB pages. Table 1(b) illustrates a significant load imbalance across the measured memory access rates on the 12 active sockets. A third variant, referred to as "Permuted" in the table uses the same memory allocation as the "Equal volume" variant but adds a permutation step, as described herein, on the non-sequential accesses. Table 1(c) shows the memory access rates resulting from the "Permuted" variant, according to one example embodiment.

The example code listing below shows, according to one embodiment, the main loop of one example network mapping and ranking algorithm, such as the PageRank™ algorithm. Labels L1 . . . L4 in the code listing below indicate the four significant memory accesses made in the loop. L1 accesses the vertices array sequentially to find the block of edges relating to the vertex v being processed. L2 accesses the edges array sequentially (with the block of edges for one vertex following immediately after the block of edges for the previous vertex). L3 accessed the current val array non-sequentially, reading the entries corresponding to the neighbors of vertex v. Finally, L4 writes the results sequentially to the new val array.

```
for (vertex_t v=0; v <num_vertex; v++) {
    double sum=0;
    edge_t e_start=vertices[v];  // L1
    edge_t e_end=vertices[v+1];
    for (edge_t e=e_start; e<e_end; e++) {
        vertex_t neighbor=edges[e];  // L2
        sum+=current_val[neighbor];  // L3
    }
    new_val[v] =sum;  // L4
}
```

In the main loop of the example network mapping and ranking algorithm shown above, values in new val array are derived from values in current val array. In a more complete example algorithm, the long running loop shown above may be followed by a relatively shorter loop to copy and scale the values from new val array to form the next contents of current val array for the next iteration through the loop.

In some embodiments, load balancing of the accesses made at L1, L2, and L4 may be achieved without applying permutation, such as by distributing each array evenly across the sockets devoted to the workload and using the largest practical page size. Further improvements may also be made to the performance of the algorithm by using conventional NUMA optimizations so that each socket holds a corresponding "slice" across the sequentially-accessed arrays and iterations of the outer loop are scheduled to run on the socket holding the data being accessed, according to some embodiments.

On some inputs the access patterns may be spread all over the complete current val array, and the access rates to individual elements may be distributed non-uniformly. For instance, when processing a social network graph, a vertex representing a celebrity may have millions of times more edges than the average vertex. This may cause a disproportionate rate of memory accesses to particular portions of the current val array (e.g., causing a hot spot or hot data). Furthermore, these problems of skew may be exacerbated if the input data is structured with many of the hot items close together in the array, such as due to sorting by popularity, previous rankings, etc.

In some embodiments, it may be difficult to achieve good load balancing at L3 purely by controlling the allocation of the current val array. First, memory management APIs generally focus on the volume of data being allocated rather than on the volume of accesses resulting from that allocation. Furthermore, the load on the memory system may only be seen after (e.g., downstream of) the processor caches. Thus, in some embodiments, some hot data may not be an issue because it will remain in cache. Second, there may be a tension between the use of large page sizes and the distribution of memory accesses. Using larger page sizes may reduce the rate of TLB misses. However, in physical memory, each page may be held in the same socket and so using a small number of large pages may harm load balancing of the memory accesses. Finally, access patterns depend on a combination of an algorithm and the data set it is accessing. Along with the impact of the cache, this makes it difficult to analyze a data set ahead of time in order to lay it out effectively in memory. For example, in some graph algorithms there may be frequent accesses to vertices with large numbers of inbound edges, while in other algorithms there may be frequent accesses to vertices with large numbers of outbound edges.

Figure 3:
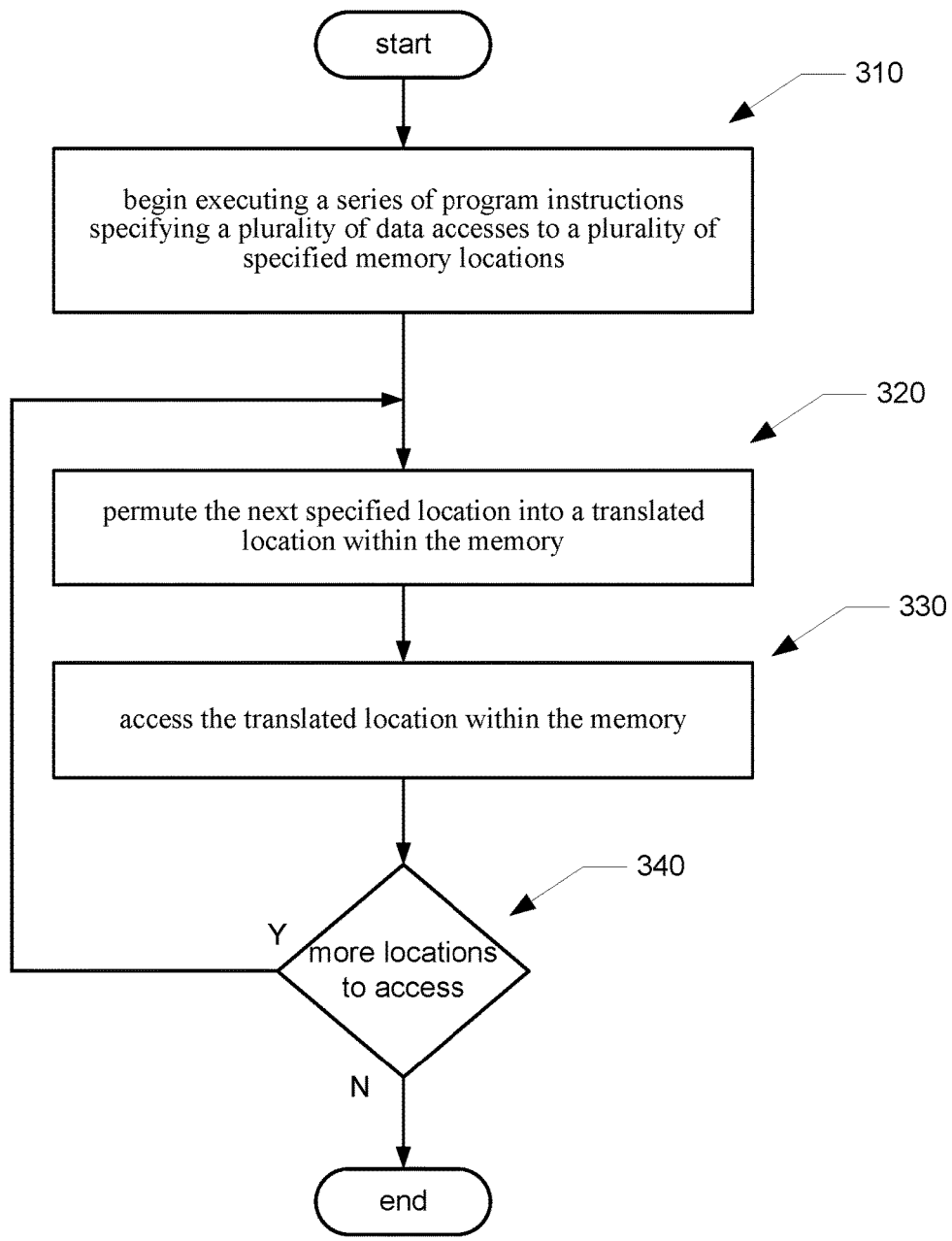
FIG. 3 is a flowchart illustrating one embodiment of a method for implementing Permuted Memory Access Mapping as described herein.

According to some embodiments, additional permutation on non-sequential accesses may be used, such as at L3 in the code example above. The line at label L3 may be rewritten from:
sum+=current_val[neighbor];
to:
sum+=current_val[fx(neighbor)];

Thus, a system configured to implement Permuted Memory Access Mapping, as described herein, may permute addresses (or locations) being accessed, such as to more evenly map a mix of sequential and non-sequential access patterns over the memory channels available and therefore to potentially avoid hot data (or hot spots) in the memory system. For example, FIG. 3 is a flowchart illustrating one embodiment of a method for implementing Permuted Memory Access Mapping, as described herein. As illustrated in block 310, a system, program, application, process, etc. may begin executing a series of program instructions specifying a plurality of data accesses to a plurality of specified memory locations, according to one embodiment. For instance, in one embodiments, an application may begin executing a series of program instructions that specify a plurality of non-sequential accesses to a large data set, such as the example data set described above, and may be configured to utilize a plurality of processes and memory channels to perform those non-sequential accesses.

In order to help avoid hot data areas (e.g., hot spots), such as may occur when a region of memory is accessed (e.g., over a single memory channel) more often than other areas of memory (e.g., over other memory channels), the application may, prior to accessing a specified location, permute the specified location into a translated location within the memory, as shown in block 320. For example, as in the code example above, each memory location to be accessed may be permuted (or translated) into a different memory location. Note, in some embodiments, an application or other process may access a data set in more than one manner and only some of those accesses may be permuted. However, in general, all accesses to a particular type of data (e.g., such as non-sequential accesses to current val in the example above) may be permuted, while access of other types of data (e.g., such as sequential access to the vertices and edge arrays in the example above) may not be permuted. Whether or not particular accesses to different types of data are permuted may be based on various criteria. For instance, in one embodiment, sequential accesses to data may not be permuted, while non-sequential accesses may be permuted. In other embodiments, however, accesses to one particular type of data (or data structure) may be permuted while accesses to another type of data (or data structure) may not. For example, in the network mapping and ranking example above, the accesses to vertex and edge array data may be permuted while the accesses to the current val array may not be permuted, according to one example embodiment.

The application may then proceed to access the translated location in the memory, as illustrated by block 330 and may also continue to permute specified locations and access the respective translated locations, as shown by decision block 340.

In some embodiments, a permuter 120 (e.g., permutation function ft in the code example above) may define and/or perform a mapping between the indices being accessed and their locations within the memory for the array. In some embodiments, the mapping defined by the permutation function may require a bijection (e.g., a one-to-one mapping between indices before and after permutation). Thus, in some embodiments, the permutation function may disperse hot data within the array more evenly across the storage used for the array. Consequently, if the array's storage is evenly allocated across the sockets then the permutation performed by permutation function may distribute the load across the sockets. Note that in the example network mapping and ranking algorithm described herein all the entries in the val array are initially (e.g., by default) identical, thus permuting access to the val array during the first iteration through the network mapping and ranking algorithm does not require any reordering of the initial val array. Any additional accesses of the val array, such as to access the final values of the val array after the example code loop above is executed may require using the same permutation to obtain the correct data, according to some embodiments.

In some embodiments, the permutation function (e.g., function fx) may take a parameter x to select among different alternative mappings. Being able to use different mappings may be beneficial compared with having one fixed mapping, given that different mappings will disperse memory accesses in different ways. In example embodiments, such as a network mapping and ranking algorithm, where the mapping is applied on accesses to an array of temporary values, the mapping can be changed on each iteration.

Table 1(c) illustrates one example of using different mappings in the network mapping and ranking example. Comparing Table 1(b) with Table 1(c), the permuted version of the workload has roughly even distribution of work between the memory channels. Comparing CPU performance counters between the OS default configuration and the permuted configuration illustrates a reduction from 1 TLB miss per 3.9 edges traversed to 1 TLB miss per 8100 edges traversed, according to one example embodiment.

The systems, methods and/or techniques described herein may utilize one or more permutation functions according to various embodiments. For example, in one embodiment, software, used on an unmodified processor, may exploit the fact that graph workloads generally exhibit low rates of instructions per cycle (IPC). For instance, the network mapping and ranking example above may have a rate of 0.007 IPC (i.e., reflecting the fact that most of the non-uniform memory accesses at line L3 in the example will miss in the last level cache). Thus, in some embodiments, the time taken by such cache misses may imply that pipeline utilization is low and hence additional work may be accomplished using otherwise-idle resources (e.g., processor resources). In some embodiments, alternative permutation functions may use instruction set (e.g., HW/processor instructions rather than SW instructions) support to implement more complex mappings (e.g., within the permutation function).

One example permutation mapping involves XORing some bits from the lower end of an array index (e.g., an array index being accessed) into the higher end of the index, according to some embodiments.

Figure 4:
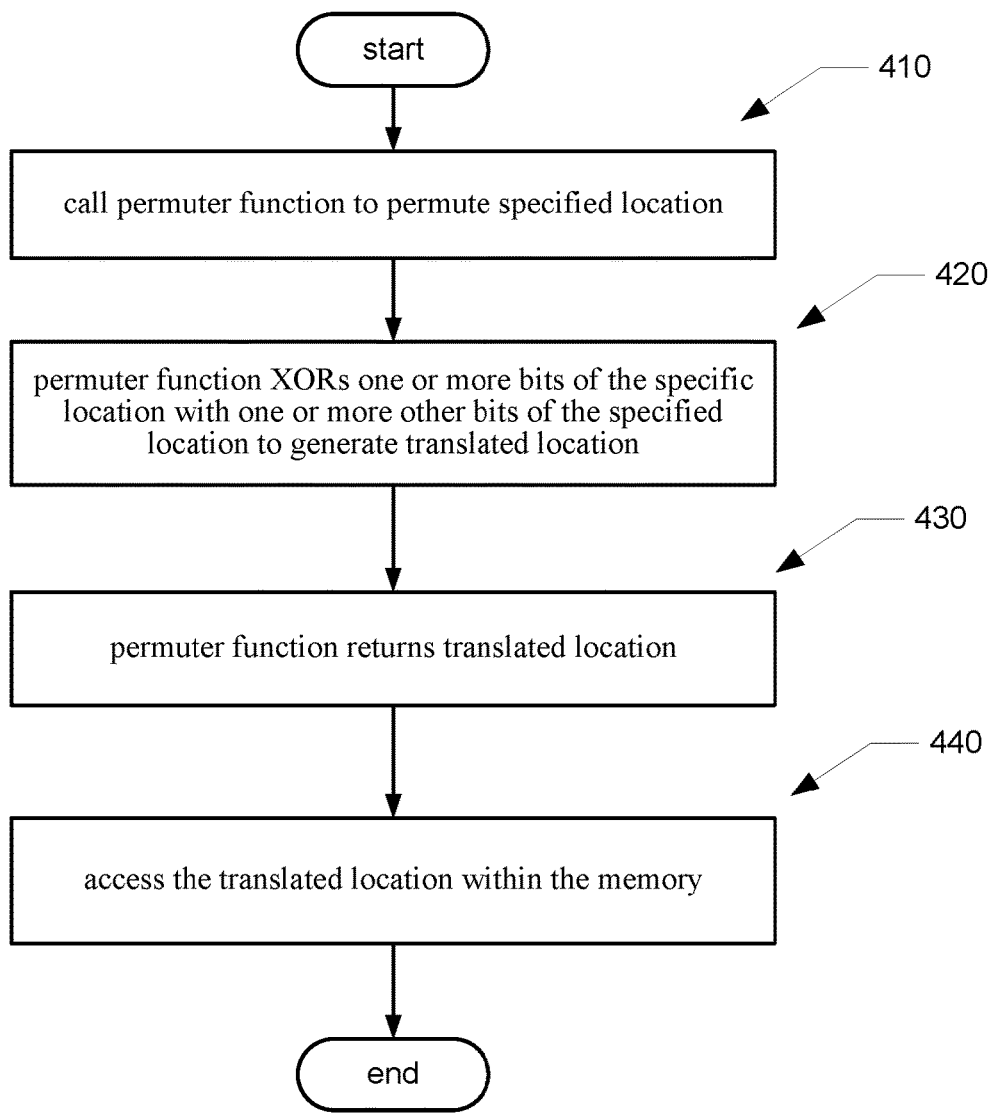
FIG. 4 is a flowchart illustrating one embodiment of method for utilizing a permuter function when implementing Permuted Memory Access Mapping, as described herein.

For instance, FIG. 4 is a flowchart illustrating one embodiment of a method for Permuted Memory Access Mapping using a permuter function, as described herein. When utilizing a permuter or permutation function, an application may, for each location being accessed, call the permuter function to permute (or translate) the specified location, as shown in block 410.

The permuter function may then XOR one or more bits of the specified location with one or more other bits of the specified location to generate a translated (or permuted) location, as in block 420. For instance, the example code listing below illustrates one embodiment of a network mapping and ranking algorithm. The example illustrated below works on array index values rather than pointers. However, in other embodiments, pointers may be utilized and permuted in a similar manner. In general, any sort of memory accesses may be permuted according to the systems, method and/or techniques described herein. In the example below, each element in the array is 8 bytes in size and the current val array, as a whole, is initially 12.5 GB - allocated as 50 * 256 MB pages. Additionally, in the example below, memory pages are allocated round-robin between sockets. In this example, we select bits starting at position 3 within in and shift these left to index 25. In addition, we must round up the allocation to 16 GB.

```
// Array of 64-bit values
// =>2^3 values per cache line
//
Array allocation size=12 * 256 MB pages
//
// Values per page=2 ^25
constexpr uint64_t low_idx=3;
constexpr uint64_t low_mask=15<<(low_idx);
constexpr uint64_t high_idx=25;
static uint64_t permute(uint64_t in) {
   uint64_t out;
   out=in^((in & low_mask)<<(high_idx-low_idx));
   return out;
}
```

The example code listing above illustrates one embodiment of a permutation function used with an example network mapping and ranking algorithm continuing the previous example. Values in the range 0..15 are extracted via the low_mask setting, picking the lowest value of $2^n-1$ greater than or equal to the number of sockets to distribute the accesses over. The value is XORed back into the index at bit position 25. Given that the array elements are 64-bit values, a change in this bit position causes a change between pages, each 256 MB in size. To ensure this access remains in-bounds, the allocation is rounded up to the next multiple of 16*256 MB =4 GB. After permuting the specified location, the permuter function returns the translated location and the calling application may then access the translated location, as in blocks 430 and 440 of FIG. 4. For instance, in the example above, the permuter function returns the variable out, which represents the translated location.

Figure 5:
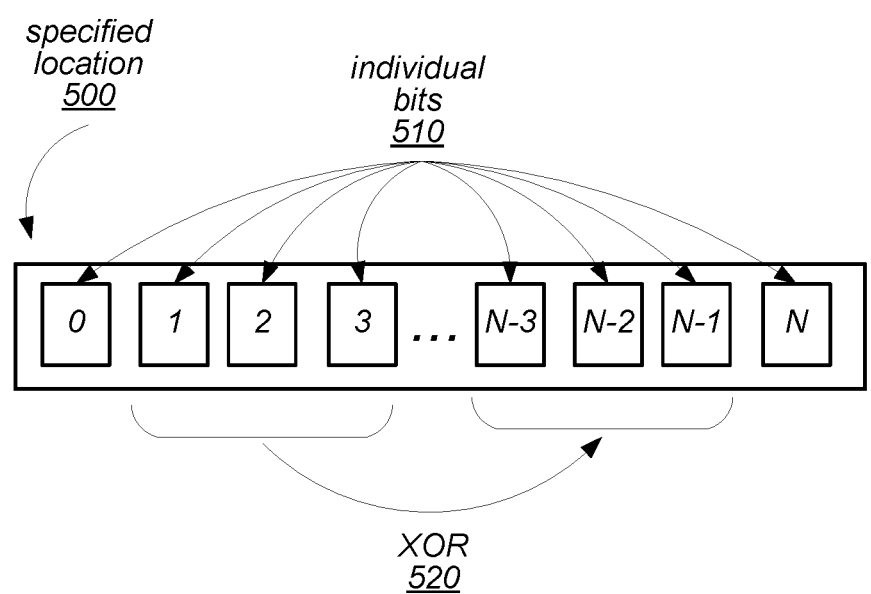
FIG. 5 is a logical block diagram illustrating one example embodiment of a permutation technique of Permuted Memory Access Mapping.

FIG. 5 is a logical block diagram graphically illustrating one embodiment of an XOR-based permutation function. As described above, a specified location 500 may be permuted by XORing, represented by XOR arrow 520, one or more bits of the location address with one or more other bits from the location address. For example, in one embodiment, specified location 500 may represent an array index and one or more bits, such as bits 1, 2 and 3 of individual bits 510, may be XORed with one or more other bits, such as bits N-3, N-2 and N-1 of individual bits 510, with the resulting new bits replacing the one or more other bits. For instance, bits N-3, N-2 and N-1 may be replaced by the result of the XOR operation. Thus, specified location 500 may be permuted, or translated, into a different location to be accessed in place of the original specified location.

While described above regarding an array index and an XOR-based operation, the methods, features, functions and/or techniques described herein regarding Permuted Memory Access Mapping may be utilized with other types of addresses (e.g., pointers, etc.) with other types of permutation mechanisms, such as addition with wrapping, multiplication, etc., according to various embodiments.

Additionally, in some embodiments system hardware may use XOR combinations of bits from different locations in a virtual or physical address. For example, within some existing systems, a data cache with 256 sets may select a set from a combination of bits across the address being accessed rather than simply extracting 8 (contiguous) bits, which may help avoid common patterns of addresses mapping to the same set. Additionally, such hardware mapping may be transparent to software executing on the system.

In some embodiments, groups of locations may be kept together across a permutation.

For example, in one embodiments, complete cache lines may be permuted while the data being accessed (e.g., non-sequentially) may hold values that span a single addressable location. For instance, continuing the example above, a current val array may hold 64-bit double values, and therefore sets of 8 values may be kept together across permutation.

Figure 6:
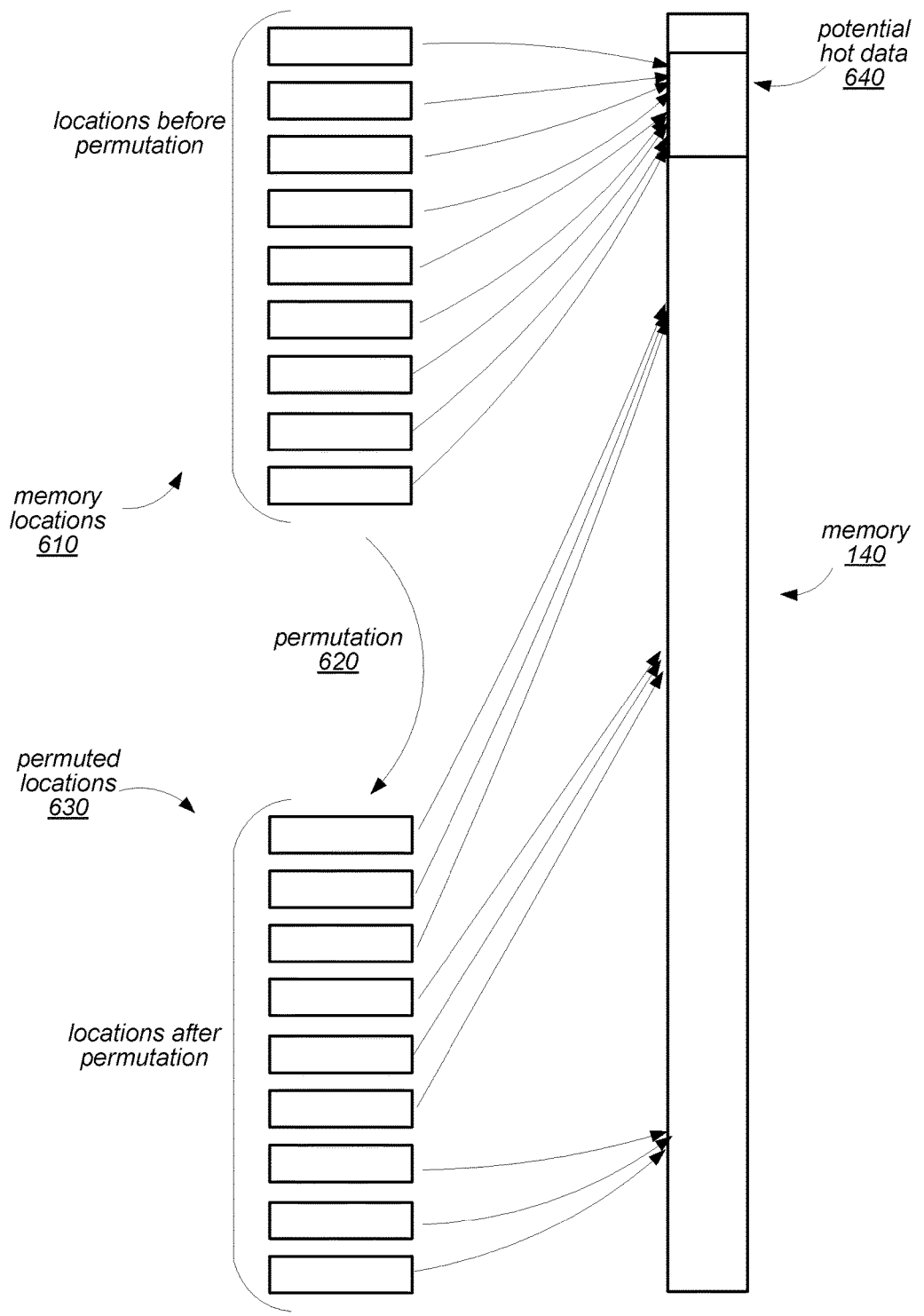
FIG. 6 is a logical block diagram illustrating maintaining contiguous groups of addresses when implementing Permuted Memory Access Mapping, according to one embodiment.

FIG. 6 is a logical block diagram illustrating maintaining contiguous groups of addresses when implementing Permuted Memory Access Mapping, according to one embodiment. If memory locations 610, which may represent various addresses within memory 140 were to be accessed without applying a permutation step, the resulting accesses may be all located within a narrow address range within memory 140, as represented by potential hot data 640. For example, in an embodiment based on a network mapping and ranking algorithm, memory locations 610 may represent accesses related to a particular popular network site, a celebrity's social network, etc. and may therefore be accessed more frequently than other locations being accessed. In addition, memory locations 610 may represent accesses via a single memory channel. In the example embodiment illustrated by FIG. 6, the data being accessed may represent values each requiring three sequential (or contiguous) addresses within memory 140.

Thus, when permuting (represented by permutation 620) memory locations 610 into permuted locations 630, sets (or groups) of contiguous locations within memory locations 610 may be translated (e.g., permuted) into corresponding sets of contiguous locations within permuted locations 630, as indicated by the arrows from permuted locations 630 to memory 140, according to one embodiment.

When maintaining contiguous groups of addresses, those contiguous groups of addresses may be dispersed relative to their pre-permutation locations. For example, while groups of permuted locations 630 may be permuted together, after permutation those groups of addresses are farther apart than the corresponding groups of memory locations 610 before being permuted. Thus, the distance between the groups of contiguous addresses (i.e., rather than between addresses within a group) after permutation is greater than the distance between those groups prior to permutation, in some embodiments.

Maintaining contiguous groups of locations (e.g., memory addresses) across permutation when implementing Permuted Memory Access Mapping may be performed utilizing any of various mechanisms, according to different embodiments. For instance, in one embodiment utilizing an XOR-based permutation mechanism, selecting particular bits for use with the XOR-based permutation mechanism may allow contiguous locations to be maintained across the permutation. Continuing the example above, individual sets of 8 values may be kept together (e.g., across permutation) via the setting low_idx, according to one embodiment. In the example code above, low idx is set to 3, representing $2^3$ (e.g., 8), ensuring that the 3 least significant bits of the address are not modified during permutation and that therefore 8 contiguous locations may be maintained across the permutation, according to this example embodiment. Thus, cache lines may also be kept together because other loops in the workload may access indices of current val sequentially.

Some embodiments may utilize the shift-and-XOR technique described above because it may be straightforward to implement on current instruction sets. In other embodiments, any of various extensions may be used, possibly improving properties of the mappings produced at the expense of additional computation.

Another example permutation may involve/utilize more complex XOR patterns when permuting array indices (and/or pointers). For example, a single mapping using 4 low-order bits to select within sets of 16 * 256 MB pages may be used in some embodiments. In some embodiments, it may be preferable to use bits from across the input. In some examples, multiple (i.e., different) permutation functions may be utilized. For instance, different permutation functions on different iterations of a network mapping and ranking algorithm implementation, according to some embodiments. Using different mappings may, in some embodiments, provide robustness against "unlucky" permutations (e.g., permutations which happen to leave hot data co-located on the same socket).

In some embodiments, when using the XOR mechanism described above the allocation size of the array may need to be rounded up so that each socket holds an equal number of pages. Rounding up the allocation size may ensure that the result of an XOR remains in- bounds of the allocation.

An alternative to the XOR mechanism described above adds the shifted value back in to the page number with arithmetic wrapping around from the highest page in use to the lowest, according to some embodiments. Thus, another example permutation function may utilize a combination by addition with wrapping technique, which may be more complex but may also provide a benefit of reducing the need to round up the allocation size, according to some embodiments.

Yet another example permutation function may utilize a multiplication-based technique. As one example of such a multiplication-based technique, a permutation function defined as f(x)–(ux+v) mod p may, for any prime p, map distinct values of x to distinct values in the range 0 . . . p where u≠0. In one example embodiment, the values u and v may be selected as with a linear congruential pseudo-random number generator, and prime p may be selected to be about the size of the array being accessed. The example multiplication-based permutation function (e.g., f(x)=(ux+v) mod p) combines bits from across the input. Additionally, different permutation mappings may be used for different implementations or may be utilized within a single implementation, according to various embodiments. For example, using the example function above, different mappings may be selected/utilized by varying u and v.

In some embodiments of Permuted Memory Access Mapping, such as with the network mapping and ranking example described herein, a permutation may be implemented using existing HW/processor instructions (e.g., given that only a few instructions are needed and the workload's IPC is relatively low). In other embodiments, however HW/processor instruction set support for permutation may be utilized. For instance, one or more hardware registers may be used to select and/or configure the desired permutation function to be used by the processor instruction(s) implementing the permutation. For example, in one embodiment one register may be used to identify a particular permutation mechanism, such as by a numeric ID, while another register may be used to store the particular location/address to be permuted according to the selected mechanism. In general, when utilizing one or more hardware instruction to translate a specified location into to a permuted (or translated) instruction, any suitable mechanism may be used to identify and/or configure the particular permutation mechanism to be used as well as to specify the address/location to be translated/permuted, according to various embodiments.

For example, according to one example embodiment using a SPARC-like architecture, HW/processor support for an XOR-based permutation function may be implemented by using one register to contain the location (e.g., memory address, array index, etc.) being accessed and a second register to describe the transformation, as shown in the example code below.

```
// Set bit-fields in %i1 to indicate the
// intended transformation.
//
// LSB 8 bits——low idx
// 8 bits——high idx
// 8 bits——high mask size
// 30 bits——low mask
setx 0x0f0f1903, %i1
// Transform the address in %i0 subject
// to configuration in %i1
permute %i0, %i1, %i2
```

In the example code above, register it may be used to configure the permutation operation. The low index may identify the lowest bit position which will be used to determine the permutation (e.g., 3, in the network mapping and ranking example above, such as to keep cache lines of 64-bit doubles together) while the high index may identify the bit position to inject the permutation (e.g., 25, in the network mapping and ranking example above, such as to correspond to 256 MB pages). Thus, according to the above example, the high mask may identify the number of bits of permutation while the low mask may select which bits from the input should be used as input to the permutation mechanism (e.g., allowing different masks to be used to get different mappings from inputs to outputs).

In some embodiments, the permutation function (or other permutation mechanism) may be implemented in the memory system transparently to software. Implementing the permutation function in the memory system transparently to software may avoid the need to change/modify existing software in some embodiments.

In some embodiments, a system may support a hardware mode which interleaves all data across sockets. For example, this technique may be suitable for low-end machines running workloads that are not optimized for multiprocessor use. However, a hardware mode that interleaves all data across sockets may not be suitable for high-end machines, such as because it may preclude the use of NUMA-specific optimizations.

Figure 7:
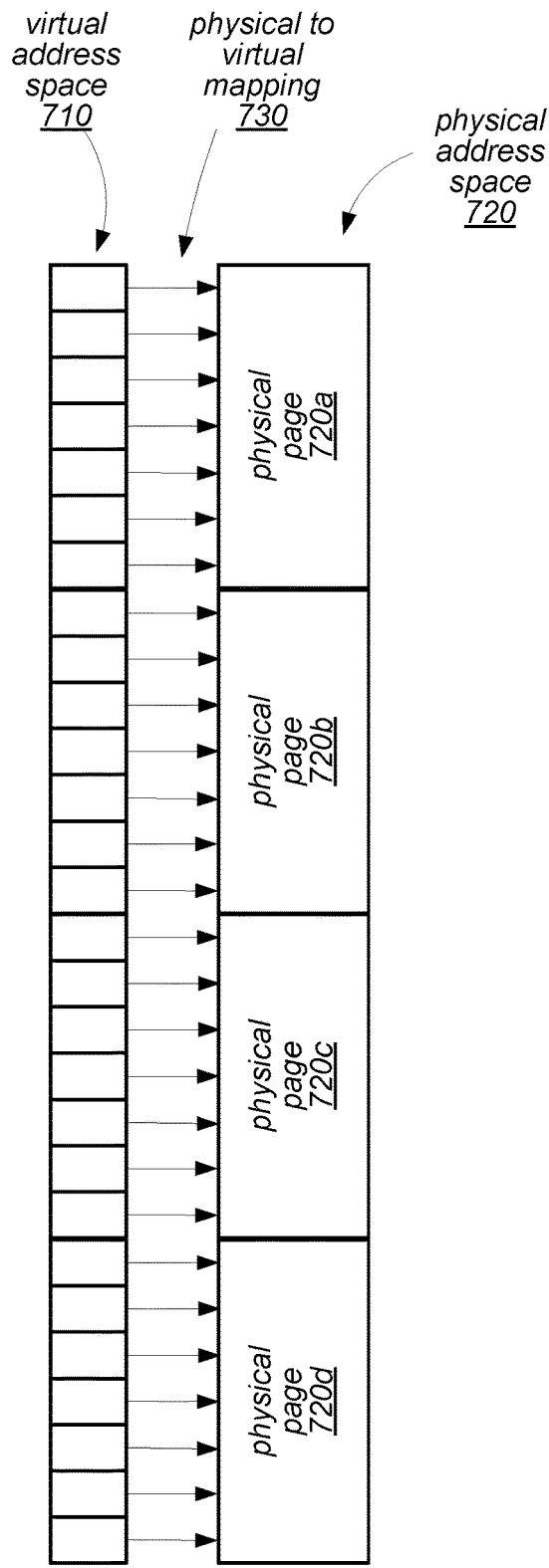
FIG. 7 is a logical block diagram illustrating 4 physical pages mapped sequentially through a virtual address space, as in one embodiment.

In some embodiments, a form of page table entry may be defined that may allow a range of virtual address space to be backed by a set of physical pages across multiple sockets. In some embodiments using existing page table entries, physical pages may be mapped sequentially in a process's virtual address space. For instance, FIG. 7 is a logical block diagram illustrating 4 physical pages mapped sequentially through a virtual address space, as in one embodiment. Thus, locations (e.g., memory addresses) of virtual address space 710 may be mapped sequentially via virtual to physical mapping 730 to physical pages 720*a..d* of physical address space 720.

Figure 8:
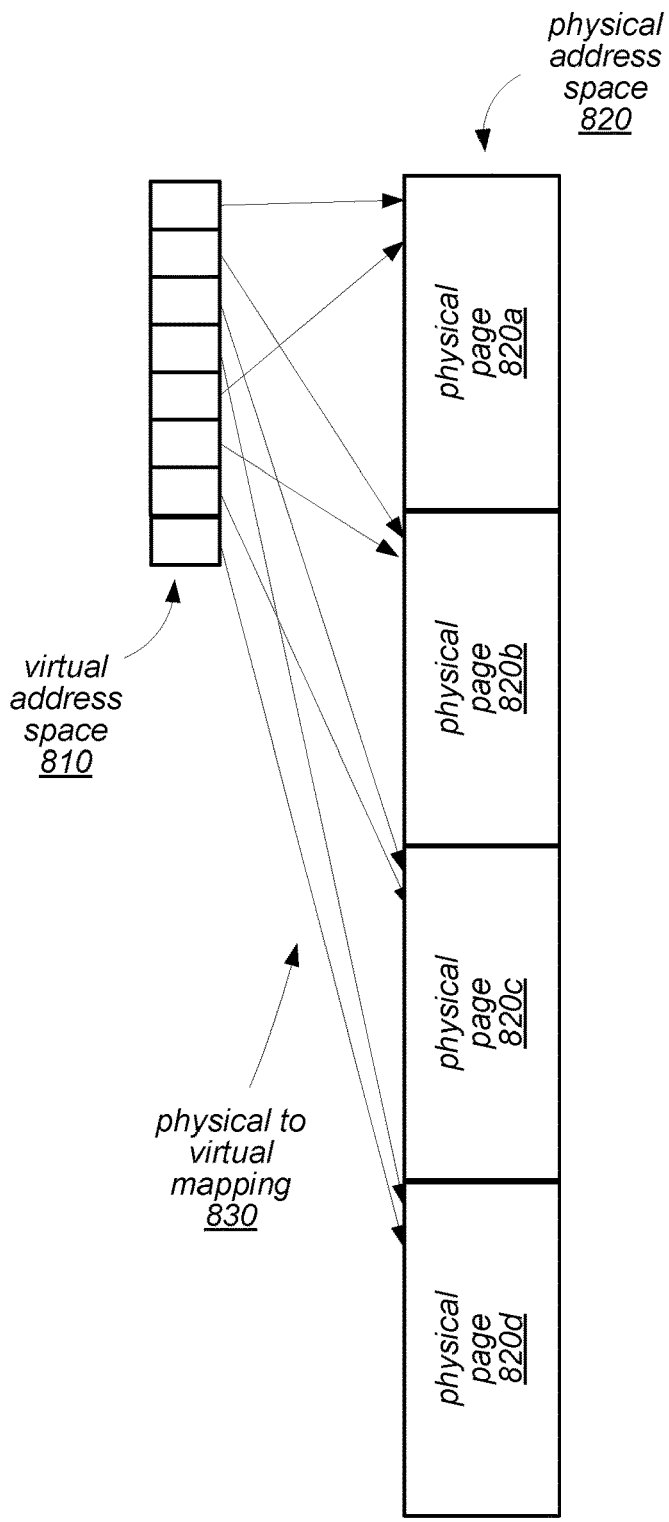
FIG. 8 is a logical block diagram illustrating a virtual address spaced mapped in an interleaved fashion across 4 physical pages, according to one embodiment.

However, in other embodiments, utilizing a different form of page table entries may be utilized allowing the virtual-to-physical mapping may be spread on a fine-grain basis across multiple (e.g., all) pages. Consider the case of a mapping of 4 large pages, one on each socket of a 4-socket machine. FIG. 8 is a logical block diagram illustrating a virtual address spaced mapped in an interleaved fashion across 4 physical pages, according to one embodiment. Locations (e.g., memory addresses) of virtual address space 810 may be mapped via virtual to physical mapping 830 across (rather than sequentially through) all four physical pages 820*a..d* of physical address space 820. Thus, in some embodiments, a system may utilize a particular virtual to physical memory mapping mechanism to cause memory accesses that might otherwise cause hot data areas to be more even spread across the physical memory, and therefore across multiple memory channels.

The software implementations described herein may, in some embodiments, be applied in usermode before ordinary (e.g., traditional) virtual-to-physical address translation and protection is applied. Furthermore, in some embodiments hardware-maintained meta-data, such as Application Data Integrity (ADI) bits, may subsequently be accessed as usual.

Figure 9:
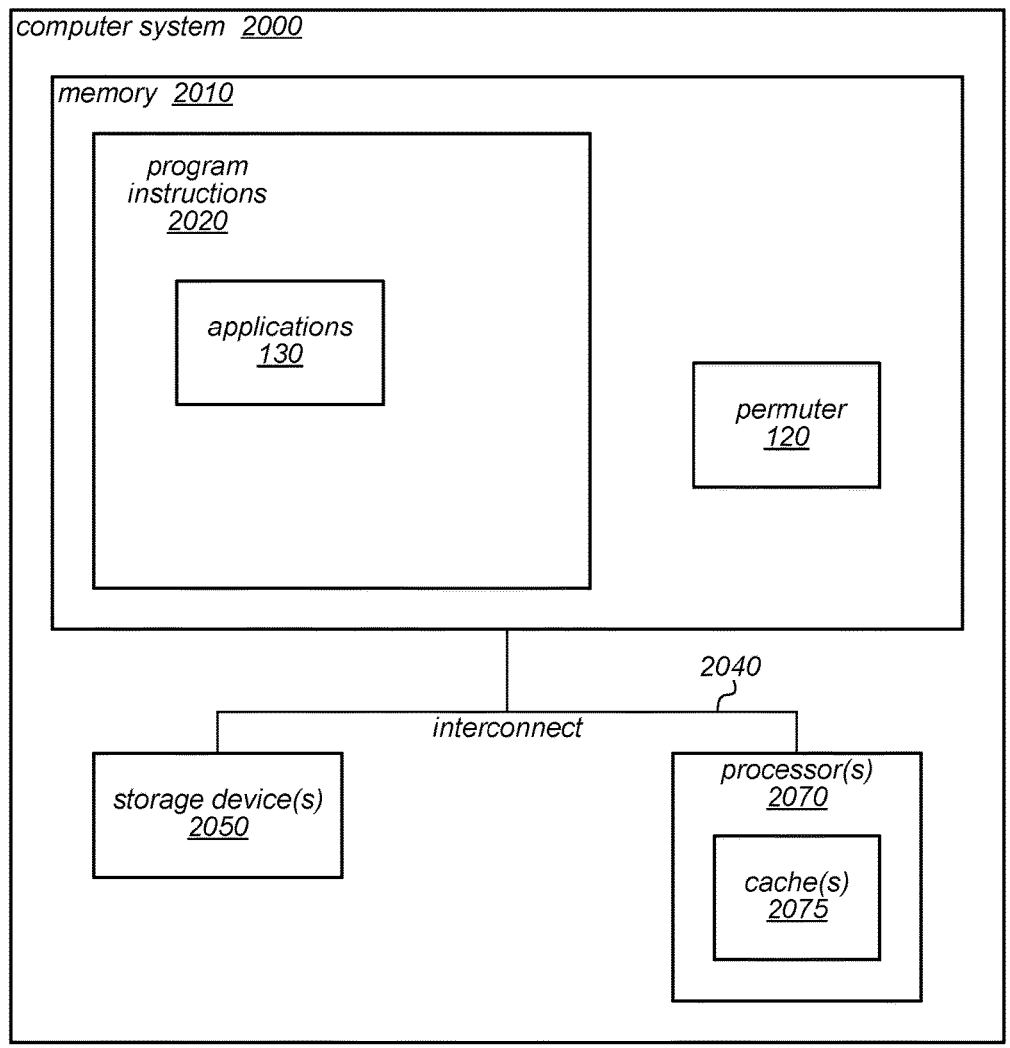
FIG. 9 is a logical block diagram illustrating one example of a system configured to implement Permuted Memory Access Mapping as described herein according to one embodiment.

The techniques and methods described herein for Permuted Memory Access Mapping may be implemented on or by any of a variety of computing systems, in different embodiments. For example, FIG. 9 is a block diagram illustrating one embodiment of a computing system that is configured to implement such techniques and methods, as described herein, according to various embodiments. The computer system 2000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the mechanisms for implementing Permuted Memory Access Mapping, as described herein, may be provided as a computer program product, or software, that may include a non-transitory, computer-readable storage medium having stored thereon instructions, which may be used to program a computer system 2000 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory;

electrical, or other types of medium suitable for storing program instructions. In addition, program instructions may be communicated using optical, acoustical or other form of propagated signal (e.g., carrier waves, infrared signals, digital signals, etc.)

In various embodiments, computer system 2000 may include one or more processors 2070; each may include multiple cores, any of which may be single- or multi-threaded. For example, multiple processor cores may be included in a single processor chip (e.g., a single processor 2070), and multiple processor chips may be included in computer system 2000. Each of the processors 2070 may include a cache or a hierarchy of caches 2075, in various embodiments. For example, each processor chip 2070 may include multiple L1 caches (e.g., one per processor core) and one or more other caches (which may be shared by the processor cores on a single processor). The computer system 2000 may also include one or more storage devices 2050 (e.g. optical storage, magnetic storage, hard drive, tape drive, solid state memory, etc.) and one or more system memories, such as memory 2010 (e.g., one or more of cache, SRAM, DRAM, RDRAM, EDO RAM, DDR 10 RAM, SDRAM, Rambus RAM, EEPROM, MRAM, STT-MRAM, persistent memory DIMM, etc.). In some embodiments, one or more of the storage device(s) 2050 may be implemented as a module on a memory bus (e.g., on interconnect 2040) that is similar in form and/or function to a single in-line memory module (SIMM) or to a dual in-line memory module (DIMM). Various embodiments may include fewer or additional components not illustrated in FIG. 9 (e.g., video cards, audio cards, additional network interfaces, peripheral devices, a network interface such as an ATM interface, an Ethernet interface, a Frame Relay interface, etc.)

The one or more processors 2070, the storage device(s) 2050, and the system memory, such as memory 2010 may be coupled to the system interconnect 2040. Memory 2010 may include program instructions 2020. Program instructions 2020 may be executable to implement one or more of the functions, features, modules, applications, etc., described herein regarding Permuted Memory Access Mapping. Program instructions 2020 may be encoded in platform native binary, any interpreted language such as Java™ byte-code, or in any other language such as C/C++, the Java™ programming language, assembly, etc., or in any combination thereof.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein and in which different embodiments of the underlying hardware that supports Permuted Memory Access Mapping described herein are supported or implemented. It is intended that the following claims be interpreted to embrace all such variations and modifications.

What is claimed:
1. A computer implemented method, comprising:
 performing by one or more processors:
  executing a series of program instructions specifying a plurality of data accesses to a memory accessible to the one or more processors via a plurality of memory channels, wherein each data access specifies a location within the memory;

permuting, during said executing for at least some of the plurality of data accesses, the respective specified location to a respective translated location within the memory; and accessing, during said executing, the respective translated location within the memory instead of the respective specified location, wherein the respective translated location is different and distinct from the respective specified location, wherein no two specified locations are permuted to a same translated location;

wherein a distance between two respective translated locations is greater than a distance between a corresponding two specified locations; and wherein the specified location is accessible via one of the memory channels and wherein the translated location is accessible via a different one of the memory channels.

2. The method of claim 1,
wherein the respective specified location is an index of an array in the memory; and
wherein the translated location is a different index of the array.

3. The method of claim 1,
wherein the respective specified location is a pointer into the memory; and
wherein the translated location is a different pointer into the memory.

4. The method of claim 1, wherein said permuting comprises modifying one or more bits of the specified location according to one or more other bits of the specified location.

5. The method of claim 1, wherein said permuting comprises XORing one or more bits of the specified location with one or more other bits of the specified location.

6. The method of claim 1, wherein said permuting further comprises translating a plurality of contiguous locations of the specified locations to a respective plurality of contiguous translated locations, such that a relative order of the contiguous specified locations is maintained within the contiguous translated locations.

7. The method of claim 1, wherein said permuting comprises translating the respective specified location into the respective translated location via one or more hardware instructions executable by the one or more processors, wherein the one or more hardware instructions are configured to translate a specified memory location into a respective translated memory location.

8. A system, comprising:
one or more processors; and
a memory coupled to the one or more processors via a plurality of memory channels;
wherein the memory comprises program instructions, that when executed by the one or more processors cause the one or more processors to:
execute a series of program instructions specifying a plurality of data accesses to a plurality of specified locations within the memory via the plurality of memory channels; and
permute, during the execution of the series of program instructions for at least some of the plurality of specified locations, the respective specified location to a respective translated location of the memory; and
access, during the execution of the series of program instructions, the respective translated location within the memory instead of the respective specified location, wherein the respective translated location is different and distinct from the respective specified location, wherein no two specified locations are permuted to a same translated location;

wherein a distance between two respective translated locations is greater than a distance between a corresponding two specified locations; and wherein the specified location is accessible via one of the memory channels and wherein the translated location is accessible via a different one of the memory channels.

9. The system of claim 8,
wherein the respective specified location is an index of an array in the memory; and
wherein the translated location is a different index of the array.

10. The system of claim 8,
wherein the respective specified location is a pointer into the memory; and
wherein the translated location is a different pointer into the memory.

11. The system of claim 8, wherein to permute the respective specified location, the program instructions further cause the one or more processors to modify one or more bits of the specified location according to one or more other bits of the specified location.

12. The system of claim 8, wherein to permute the respective specified location, the program instructions further cause the one or more processors to XOR the one or more bits of the specified location with the one or more other bits of the specified location.

13. The system of claim 8, wherein to permute the respective specified location, the program instructions further cause the one or more processors to translate one or more contiguous specified locations to a respective one or more contiguous translated locations, such that a relative order of the contiguous specified locations in maintained within the contiguous translated locations.

14. The system of claim 8,
wherein the one or more processors are configured to implement one or more hardware instructions configured to translated a specified memory location into a respective translated memory location; and
wherein to permute the respective specified location, the program instructions further cause the one or more processors to translate the respective specified location into the respective translated location via the one or more hardware instructions.

15. A non-transitory, computer-readable storage medium storing program instructions that when executed on one or more computers cause the one or more computers to perform:
executing a series of program instructions specifying a plurality of data accesses to a memory accessible to the one or more processors via a plurality of memory channels, wherein each data access specifies a location within the memory;
permuting, during said executing for at least some of the plurality of data accesses, the respective specified location to a respective translated location within the memory; and
accessing, during said executing, the respective translated location within the memory instead of the respective specified location, wherein the respective translated location is different and distinct from the respective specified location, wherein no two specified locations are permuted to a same translated location;

wherein a distance between two respective translated locations is greater than a distance between a corresponding two specified locations; and wherein the specified location is accessible via one of the memory channels and wherein the translated location is accessible via a different one of the memory channels.

16. The non-transitory, computer-readable storage medium of claim 15, wherein the respective specified location is an index of an array in the memory; and wherein the translated location is a different index of the array.

17. The non-transitory, computer-readable storage medium of claim 15, wherein the respective specified location is a pointer into the memory; and wherein the translated location is a different pointer into the memory.

18. The non-transitory, computer-readable storage medium of claim 15, wherein said permuting comprises modifying one or more bits of the specified location according to one or more other bits of the specified location.

19. The non-transitory, computer-readable storage medium of claim 15, wherein said permuting comprises XORing one or more bits of the specified location with one or more other bits of the specified location.

20. The non-transitory, computer-readable storage medium of claim 15, wherein said permuting comprises translating the respective specified location into the respective translated location via one or more hardware instructions executable by the one or more computers, wherein the one or more hardware instructions are configured to translate a specified memory location into a respective translated memory location.

* * * * *

UNITED STATES PATENT AND TRADEMARK OFFICE
CERTIFICATE OF CORRECTION

Page 1 of 2

PATENT NO. : 10,176,109 B2
APPLICATION NO. : 15/493035
DATED : January 8, 2019
INVENTOR(S) : Harris et al.

It is certified that error appears in the above-identified patent and that said Letters Patent is hereby corrected as shown below:

In the Specification

In Column 7, Lines 52-63, delete "A second variant, referred to as "Equal volume" in the table above, explicitly selects a page size for each allocation and distributes 1/16 of the allocation onto each of the 16 active sockets. In this example, allocations may tend to be made with 256 MB and 2 GB pages. Table 1(b) illustrates a significant load imbalance across the measured memory access rates on the 12 active sockets. A third variant, referred to as "Permuted" in the table uses the same memory allocation as the "Equal volume" variant but adds a permutation step, as described herein, on the non-sequential accesses. Table 1(c) shows the memory access rates resulting from the "Permuted" variant, according to one example embodiment." and insert the same on Column 7, Line 51, as a continuation of the same paragraph.

In Column 12, Lines 16-22, delete "For example, in one embodiments, complete cache lines may be permuted while the data being accessed (e.g., non-sequentially) may hold values that span a single addressable location. For instance, continuing the example above, a current val array may hold 64-bit double values, and therefore sets of 8 values may be kept together across permutation." and insert the same on Column 12, Line 15, as a continuation of the same paragraph.

In Column 12, Lines 41-47, delete "Thus, when permuting (represented by permutation 620) memory locations 610 into permuted locations 630, sets (or groups) of contiguous locations within memory locations 610 may be translated (e.g., permuted) into corresponding sets of contiguous locations within permuted locations 630, as indicated by the arrows from permuted locations 630 to memory 140, according to one embodiment." and insert the same on Column 12, Line 40, as a continuation of the same paragraph.

In Column 13, Line 47, delete "f(x)-(ux+v) mod p" and insert -- $f(x)=(ux+v) \bmod p$ --, therefor.

In Column 15, Lines 61-65, delete "electrical, or other types of medium suitable for storing program instructions. In addition, program instructions may be communicated using optical, acoustical or other Signed and Sealed this
Fourteenth Day of January, 2020

Andrei Iancu
*Director of the United States Patent and Trademark Office* form of propagated signal (e.g., carrier waves, infrared signals, digital signals, etc.)" and insert the same on Column 15, Line 60, as a continuation of the same paragraph.

In the Claims

In Column 18, Line 39, in Claim 13, delete "in" and insert -- is --, therefor.

In Column 18, Line 44, in Claim 14, delete "translated" and insert -- translate --, therefor.